United States Patent [19]

Falk et al.

[11] Patent Number: 5,077,793
[45] Date of Patent: Dec. 31, 1991

[54] RESIDUE NUMBER ENCRYPTION AND DECRYPTION SYSTEM

[75] Inventors: R. Aaron Falk, Renton; Theodore L. Houk, Seattle, both of Wash.

[73] Assignee: The Boeing Company, Seattle, Wash.

[21] Appl. No.: 642,561

[22] Filed: Jan. 18, 1991

Related U.S. Application Data

[63] Continuation of Ser. No. 414,017, Sep. 29, 1989, abandoned.

[51] Int. Cl.[5] .................... H04K 1/00; H04K 9/00; G06F 7/38
[52] U.S. Cl. .................................... 380/28; 364/200; 364/746; 395/375; 380/30
[58] Field of Search .................... 380/28, 30; 364/200, 364/900, 746

[56] References Cited

U.S. PATENT DOCUMENTS 4,172,213 10/1979 Barnes et al.
4,797,843 1/1989 Falk et al. ............................ 364/713
4,879,747 11/1989 Leighton ............................. 380/23

OTHER PUBLICATIONS

Beker, H. et al., "Cipher Systems-The Protection of Communications", A Wiley-Interscience Publication, John Wiley and Sons, 1982, pp. 59-71.
Szabo, N. S. et al., "Residue Arithmetic and its Applications to Computer Technology", McGraw-Hill Book Company, pp. 12-51.
Shenoy, A. P. et al., "A Pine Lined High Throughout RNS to Weighted Binary Converter".
Fred E. Nathanson, "Radar Design Principles-Signal Processing and the Environment", McGraw-Hill Book Company, 1969, pp. 5-7.

Primary Examiner—Stephen C. Buczinski
Attorney, Agent, or Firm—Foley & Lardner

[57] ABSTRACT

An encryption and decryption system performs encryption and decryption using the residue number system. A binary input signal is converted into residue number system representation in a binary to residue converter. Pseudo random numbers, generated from pseudo random number generators, are then added to the converted input signal in modular, that is, residue number system, adders. The outputs of the modular adders are converted into binary or mixed radix digit representation and are then transmitted to the location of a decrypter. The transmitted binary or mixed radix digit signal is converted back into residue number system representation in another converter and is then decrypted by subtracting the pseudo random number sequence. This decrypted signal is then converted into binary representation. The binary representation of the decrypted signal resembles the input signal.

25 Claims, 7 Drawing Sheets

RESIDUE NUMBER ENCRYPTION AND DECRYPTION SYSTEM

This application is a continuation of application Ser. No. 07/414,017, filed Sept. 29, 1989, now abandoned.

BACKGROUND OF THE INVENTION

The present invention relates to cryptography. Specifically, the invention relates to encryption systems which mix an input signal with a signal corresponding to a pseudo random number, in order to encrypt the input signal.

There is considerable need for high speed encrypting of information. High speed encrypters are utilized, for example, in numerous aerospace applications such as low probability of intercept (LPI) communications, satellite communications (COMSAT), multi-level secure local area networks (MLS-LAN) and agile radars, as well as in other applications. The levels of encryption required vary in each case For example, LPI applications may require only a few hours of security whereas MLS-LAN information may be required to be secure for several years. In all applications, high speed, that is greater than 100 MHz, is required.

Encryption involves combining an input data, or plaintext, stream with a pseudo random number sequence (PRS) data stream at a transmitter end, and decryption involves essentially the reverse procedure at a receiver end. This reversal process requires the receiver to generate the same PRS that was used to encrypt the input data at the transmitter end. A "key" is usually passed from the transmitter end to the receiver end which informs the receiver end of the PRS being employed.

The length of the PRS is defined as the number of characters in the PRS before the PRS repeats. The difficulty of breaking a cipher is related to the length of the PRS. The longer the PRS, the more difficult the cipher is to break. Thus, a good encrypter must generate a long PRS without excessive hardware. *Cipher Systems The Protection of Communications*, by H. Beker and F. Piper (John Wiley & Sons, Inc., New York 1982) pages (59-71, provides a general background discussion of cryptographic devices, including the M-209 Converter discussed below and is incorporated herein by reference.

Figure 1:
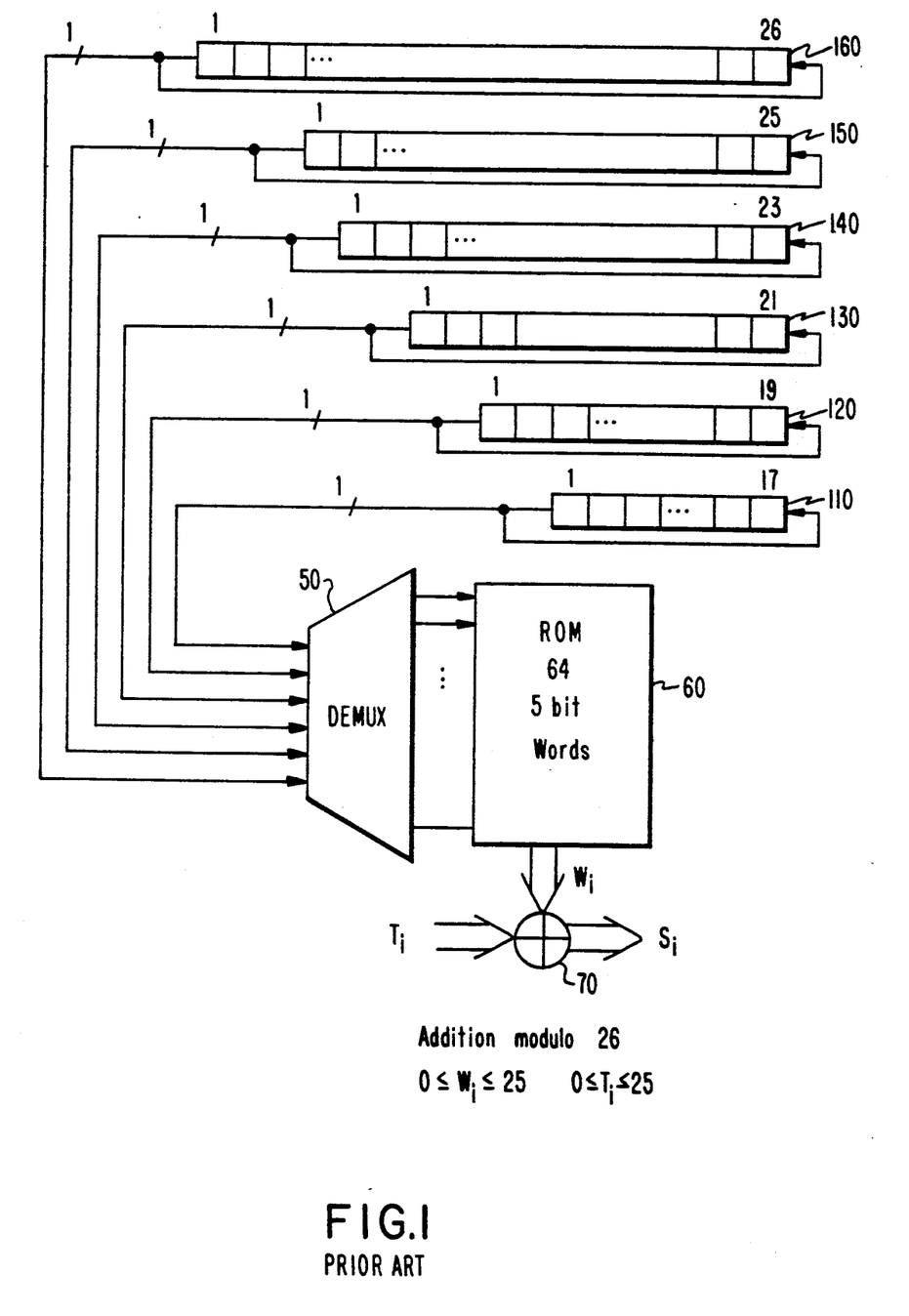
FIG. 1 illustrates a prior art method of generating long pseudo random number sequences.

An example of a prior art method used to generate long PRS's will be discussed with reference to FIG. 1. The electronic method illustrated in FIG. 1 is analogous to the mechanical method employed in the widely used M-209 Converter and its derivatives. In FIG. 1, a set of six short length binary PRS's 110, 120, 130, 140, 150, and 160 are stepped past a demultiplexer and reading point 50 to form a six bit binary number. The six short length binary PRS's 110, 120, 130, 140, 150, and 160 have lengths of 17, 19, 21, 23, 25, and 26 bits, respectively. These lengths are carefully chosen so that no two of them have a common factor, that is, these lengths are mutually prime numbers. As the six short length binary PRS's 110, 120, 130, 140, 150, and 160 are stepped past the demultiplexer and reading point 50 in time, a longer PRS is generated. If the six short length binary PRS's 110, 120, 130, 140, 150, and 160 are internally aperiodic, the length of the longer PRS is the product of the lengths of the individual short length binary PRS's or 101,405,850. The six bit binary number is used as an address to specify a 5 bit word W, having digits $w_1 \ldots w_5$, stored in a read only memory unit 60. This 5-bit word W is applied to a number T representing a single alphabetic character of a plaintext message in an adder 70 using addition module 26 to produce encrypted message S. It should be noted that in the M-209. Converter itself, the reduction analogous to the reduction performed by the read only memory unit 60 is done mechanically by lugs and a lug cage.

The prior art encrypters, such as the one described, do not provide an acceptable degree of encryption at high speed. This lack of speed and lack of acceptable encryption is in part due to the nature of the binary arithmetic required by these prior art encrypters.

SUMMARY OF THE INVENTION

It is an object of the invention to provide a high speed encryption and decryption system which employs the residue number system to generate a signal which is difficult to decipher.

Another object of the invention is to provide a high speed encryption and decryption system which performs encryption with a long effective pseudo random number sequence with a minimum of hardware.

Another object of the invention is to provide an encryption and decryption system that will exceed LPI needs.

Yet another object of the invention is to provide an encryption and decryption system that can be adapted to perform increasingly complex tasks without compromising speed.

A further object of the invention is to provide an encryption and decryption system that is capable of having its keyspace expanded, without loss of speed.

The invention is directed toward an encryption and decryption system which uses the residue number system. A binary input signal is converted into residue number system representation in a converter. A pseudo random number sequence is then added to the converted input signal in modular, that is, residue number system, adders. The outputs of the modular adders are converted into binary representation for transmission to the location of a decrypter. After reception at the location of the decrypter, the transmitted binary signal is then converted back into residue number system representation in another converter and is decrypted by subtracting the pseudo random number sequence. This decrypted signal is then converted into binary representation. The binary representation of the decrypted signal resembles the input signal. Since the number of modular operations may be increased without a decrease in speed, the complexity of the encryption can likewise be increased without a decrease in speed.

BRIEF DESCRIPTION OF THE DRAWINGS

The invention is described below with reference to the accompanying drawings, wherein.

DETAILED DESCRIPTION OF THE PREFERRED EMBODIMENTS

Residue number theory is described in detail in *Residue Arithmetic and Its Applications to Computer Technology*, by N. S. Szabo and R. I. Tanaka (McGraw-Hill, New York 1967), incorporated herein by reference. Devices that will perform modular arithmetic and devices for pipelined and parallel conversion utilizing a residue number system (RNS) representation are described in U.S. Pat. No. 4,797,843, issued Jan. 10, 1989, entitled "Parallel Optical Arithmetic/Logic Unit"; and copending applications Ser. Nos. 07/019,761, filed Feb. 27, 1987, entitled "Optical Cross Bar Arithmetic/Logic Unit"; Ser. No. 07/219,392, filed July 15, 1988, entitled "Optical Computer Including Pipelined Conversion of Numbers to Residue Representation", and issued as U.S. Pat. No. 4,948,959, on Aug. 14, 1990; Ser. No. 07/233,610, filed Aug. 18, 1988, now U.S. Pat. No. 4,910,699 entitled "Parallel Residue-to-Binary Converter" and issued as U.S. Pat. No. 4,910,699 on Mar. 20, 1990, all incorporated herein by reference. In addition, *A Pipelined, High Throughput RNS to Weighted Binary Converter*, by A. P. Shenoy and R. Kumaresan (Midwest Symposium of Circuits and Systems, Lincoln, Nebraska 1986), incorporated herein by reference, also discusses pipelined converters.

An integer is represented in the residue number system by writing down an n-tuple where the $i^{th}$ digit is the remainder after division of the integer by an associated modulus, $m_i$. If the moduli are chosen to be mutually prime, then all integers with the range of zero to the product of the moduli minus one can be uniquely represented.

The importance of the residue number system to numerical processing is that the operations of addition, subtraction, and multiplication can be performed without the use of carry operations between the moduli. In other words, each digit in the n-tuple can be operated on independently and in parallel. For example, if two n-tuples X, having digits $x_1 \ldots x_n$, and Y, having digits $y_1 \ldots y_n$, are added to produce Z, having digits $z_1 \ldots z_n$, then the $i^{th}$ digit is given by:

$$z_i = (x_i + y_i) \bmod m_i \qquad (1)$$

The mod function takes the number in front of "mod", in this case $x_i + y_i$, and divides this number by the number after "mod", in this case $m_i$, and substitutes the remainder for the entire function.

The power of residue representation is that an operation on large numbers can be broken down into small parallel modular operations. For example, a sixteen bit binary number can be represented in the residue number system using the five moduli 5, 7, 11, 13 and 17. Multiplication of two 8 bit binary numbers may produce a 16 bit result and require 15 carry operations. In contrast, modular arithmetic devices can perform the same multiplication operation in a single parallel step without any carry operations. Because modular arithmetic operations can be performed in a single step regardless of the length of the operands, the keyspace, or number of possible keys, in a residue number based encryption system may be expanded without a loss of speed.

Residue operations result in numbers module the product of the moduli, that is, there is no truncation. Since the moduli are chosen to be prime integers, modular operations, except for multiplication by zero, are inherently reversible.

Figure 2:
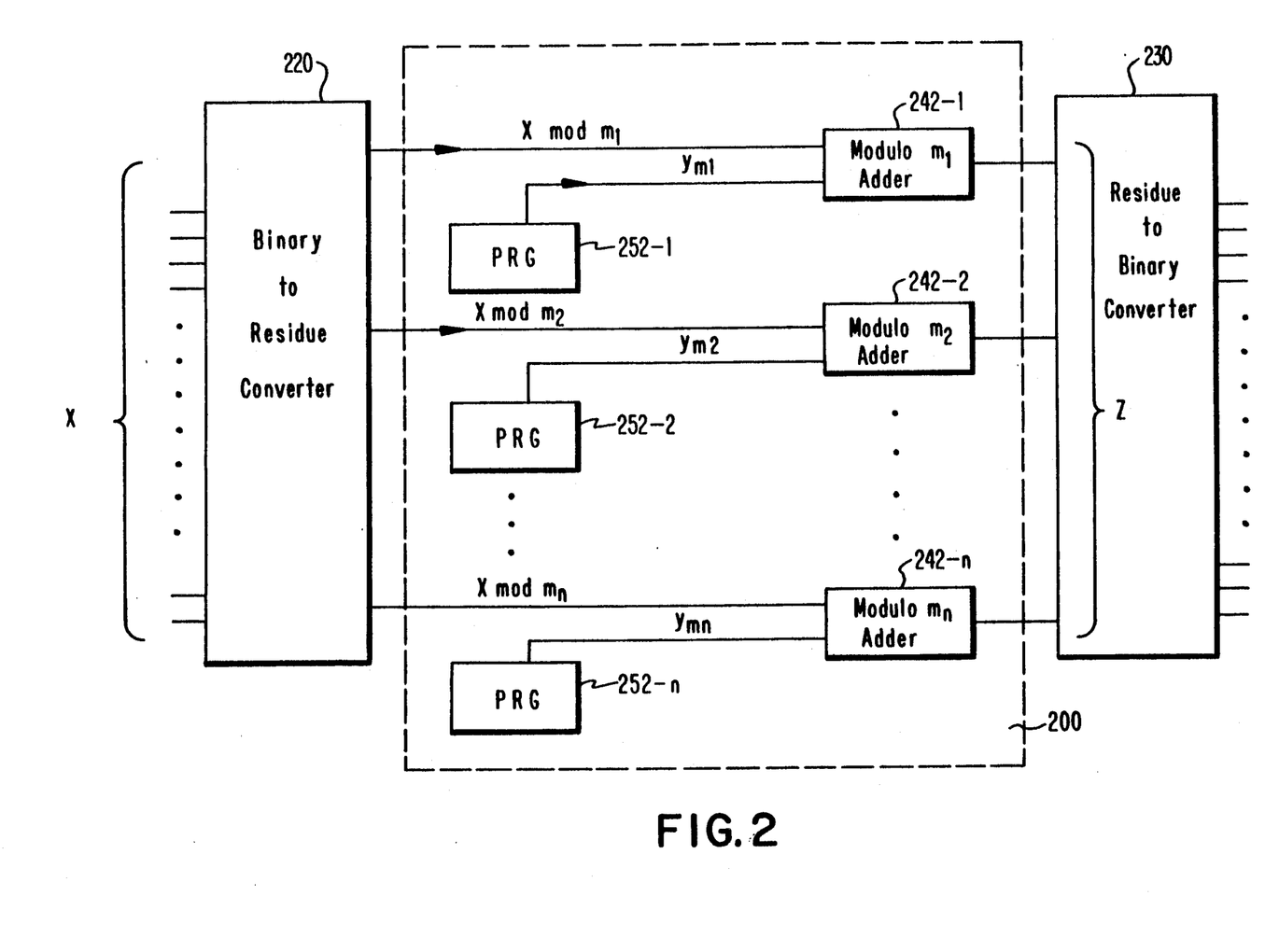
FIG. 2 illustrates an encrypter according to a first preferred embodiment of the invention.

An encrypter 200 according to a preferred embodiment of the invention is illustrated in FIG. 2. The encrypter 200 is part of a residue number encryption and decryption system illustrated in FIGS. 2 and 3. In reference to FIG. 2, a binary input number, or signal, X is received in a binary to residue converter 220. This binary input number X could represent alphabetic information, numerical information, or any other form of information. The binary input number X to be encrypted may be called the plaintext. The binary input number X is converted, by the binary to residue converter 220, into residue number system representation. Details of a suitable binary to residue number converter employing optical components may be found in copending application No. 07/219,392 referred to above. The residue number system employed has moduli $m_1 \ldots m_n$ which are selected to be mutually prime numbers. The moduli and ranges of the input numbers are chosen such that the product M of all the moduli is greater than or equal to the range of the input binary numbers.

Pseudo random number generators (PRG's) 252-1 through 252-n generate pseudo random number sequences in an RNS representation. The pseudo random number sequence generated by one of the PRG's is, in general, different from the sequence generated by the other PRG's. The lengths of the generated pseudo random number sequences are mutually prime numbers. PRG's such as described in the *Cipher Systems* reference cited above may be used together with a number to RNS converter as described, for example, in copending application No. 07/291,392. Converting pseudo random number sequences which have a uniform frequency distribution in one number system, e.g., uniform over the binary number interval 0 to 255, to residue numbers having a modulus m! generally produces a nonuniform frequency distribution of such residue numbers. It is advantageous for encryption purposes to have a uniform frequency distribution of residue numbers from each PRG. Therefore, as an advantageous alternative, the PRG's may directly generate the pseudo-random sequence in RNS representation. The range of the pseudo random numbers produced by each of the PRG's runs from zero to one less than its associated modulus. For example, if moduli 2, 3, 5, and 7 were being used, the range of pseudo random numbers could be 0 to 1, 0 to 2, 0 to 4, and 0 to 6 respectively. By use of the Chinese Remainder Theorem described in the *Residue Arithmetic and Its Applications to Computer Technology* reference cited above, it can be shown that the ensemble of residue numbers $Y_{mi}$ produced simultaneously by the PRG's forms a number Y mod M which is called the keyword Y.

There are at least two techniques for generating a pseudo random sequence of residue numbers. The first technique is similar to the technique described with respect to FIG. 1, which shows binary PRG's 110, 120, 130, 140, 150, 160. Each PRG in FIG. 1 circulates a stream of one bit digits. If each PRG instead circulates a stream of one digit pseudo random residue numbers, each PRG directly generates a pseudo-random sequence in RNS representation. The length of each pseudo random number sequence equals the number of register stages through which that sequence circulates. Optical or electronic registers can be used to circulate the numbers.

The second technique is described in Fred E. Nathanson's book *Radar Design Principles, Signal Processing and the Environment*, McGraw-Hill 1969, section 12.2, pages 457 to 459. This text describes a binary shift register which forms powers of an input binary bit. This input is a feedback signal derived from a module 2, i.e., binary one bit, adder. There must be an even number of inputs to the module 2 adder. This PRG has the advantage of using much less hardware than required for the FIG. 1 technique to achieve a given sequence length. To generalize this technique to a PRG with a RNS output, a stream of one digit pseudo random residue numbers module $m_i$ is circulated through a chain of multiplying ALU's connected to form the sequence $X^1$ mod $m_i$, $X^2$ mod $m_i$, $X^3$ mod $m_i$ and so on. The feedback is via a module $m_i$ adder.

The modulus $m_1$ term corresponding to the input signal X, that is X mod $m_1$, and a pseudo random number generated by the PRG associated with modulus $m_1$, that is the pseudo random number generated by PRG 252-1, are put into a modulo m adder 242-1. In a similar fashion, the moduli $m_2$ through $m_n$ terms corresponding to the input signal X, that is X mod $m_2$ through X mod $m_n$, and the pseudo random numbers generated by the PRG's associated with moduli $m_2$ through $m_n$, that is the pseudo random numbers generated by PRG's 252-2 through 252-n, are input to module adders 242-2 through 242-n. The modulo adders 242-1 through 242-n are arranged in parallel to one another.

Since the lengths of the pseudo random number sequences generated by each of PRG's 252-1 through 252-n are mutually prime, the effective overall pseudo random number sequence is the product of the lengths of the pseudo random number sequences generated by all the PRG's.

The effect of the encrypter 200 may be expressed mathematically by:

$$Z = (X + Y) \mod M \quad (2)$$

where:

X is the input number;
Y is a pseudo random number defined by the residue numbers $y_1, y_2 \ldots y_n$ resulting from the combination of all the PRG's;
M is the product of all the moduli, i.e., $M = m_1 . m_2 \ldots m_n$;
Z is the encrypter output.

The outputs of the modulo adders 242-1 through 242-n are converted into binary representation in a residue to binary converter 230. Details of such conversion may be found in copending application Nos. 07/219,392 and 07/233,610 mentioned above. The output of the residue to binary converter 230 is the encrypted signal, or ciphertext, to be transmitted.

The processing performed by the binary to residue converter 220, the encrypter 200, and the residue to binary converter 230 may be performed, for example, by electronic or optical means. The binary to residue converter 220 and the residue to binary converter 230 may be omitted if conversion is not required.

Equation 2 above is a generalization of the Vigenere cipher. The encrypter 200 has the property that any input number has an equal probability of becoming any other number in the range of M. M can be larger than the range of the input number X and the encrypted signal does not have to be commensurate with the number of bits, typically 8, usually used to represent an alphabetic character.

Figure 3:
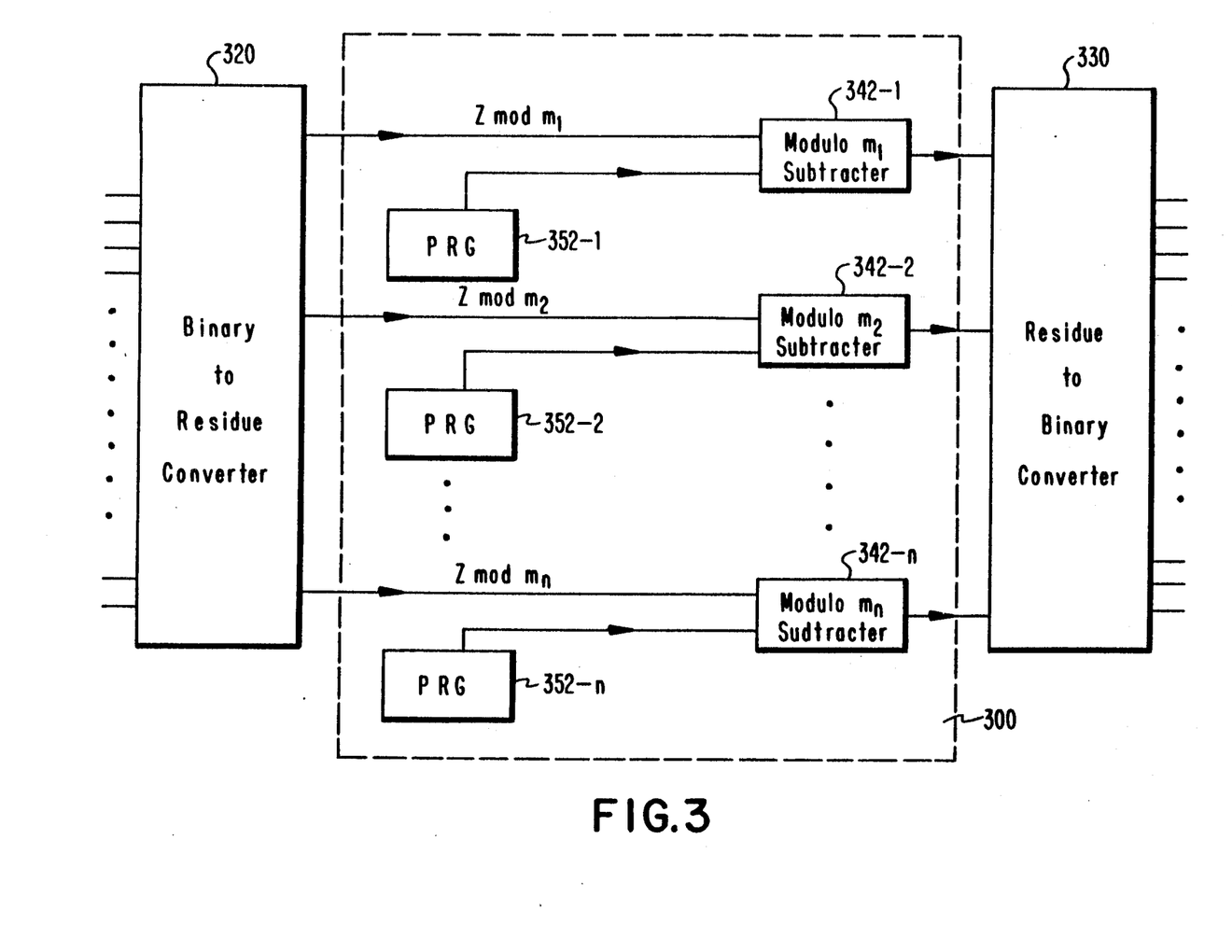
FIG. 3 illustrates a decrypter according to a first preferred embodiment of the invention.

The encrypted signal is received in a binary to residue converter 320 as shown in FIG. 3. After the encrypted signal is converted by the binary to residue converter 320, the converted signal is decrypted in a decrypter 300. The decrypter 300 subtracts the pseudo random number sequences that were used by the encrypter 200 in encrypting the data.

In order to generate the pseudo random number sequences that were used by the encrypter 200, a key must be passed between the encrypter 200 location and the decrypter 300 location. The key must provide the starting points used by PRG's 252-1 through 252-n in the encryption, so that PRG's 3521 through 352-n in the decrypter 300 may be set to the same starting point. Since the moduli $m_1, m_2 \ldots m_n$ used by the encrypter 200 may vary to make unauthorized deciphering more difficult, the key must also indicate which moduli are being used by the encrypter 200. The specific moduli being used can be varied in the course of a single message. For example, the moduli being used may vary for each character.

Modular subtractors 342-1 through 342-n subtract the pseudo random number sequences from the converted encrypted signal. The results of the subtractions are input into a residue to binary converter 330 to be converted into binary representation. The output of the residue to binary converter 330 is the decrypted signal, resembling the original input signal X. The processing performed by the binary to residue converter 320, the decrypter 300, and the residue to binary converter 330 may be performed, for example, by electronic or optical means.

Figure 4:
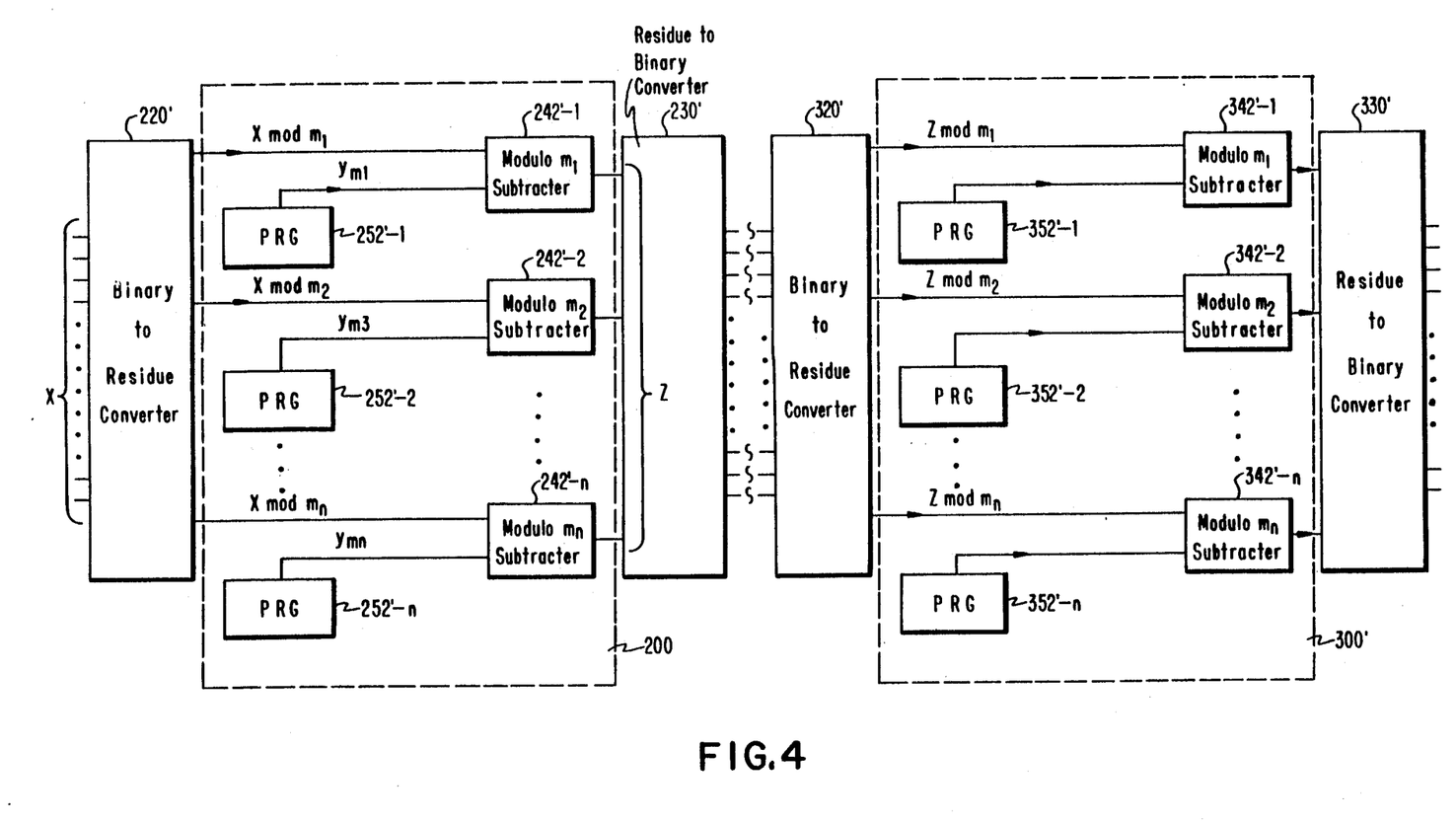
FIG. 4 illustrates a second preferred embodiment of the invention.

In a second preferred embodiment, encryption occurs according to the equation:

$$Z = (Y - X) \mod M \quad (3)$$

In this second embodiment, the input signal X is subtracted from the pseudo random number Y by replacing the modular adders 242-1 through 242-n with modular subtracters. The equation (3) method of encryption is a generalization of the Beaufort cipher. The Beaufort cipher is the cipher used in the mechanical M-209 Converter. An encrypter according to the second embodiment has the property that:

$$X = (Y - Z) \mod M \quad (4)$$

Therefore, the input signal X may be recovered from the encrypted signal Z by sending the encrypted signal Z through the encrypter a second time. In other words, the encrypter and the decrypter may be identical, thus eliminating the need for two different types of devices. A block diagram illustrating this second embodiment of the invention is shown in FIG. 4 wherein primed numbers are utilized to correspond to analogous elements of FIGS. 2 and 3.

The conversion to and from binary representation is a crucial part of the encryption and decryption process as it is this conversion that combines the individual modular arithmetic results.

A number system which will permit a reduction in conversion hardware is the mixed radix, or mixed base, number representation. The Szabo and Tanaka book, the Shenoy and Kumaresan paper, and the 07/219,392 patent application cited above discuss the mixed radix number system in detail.

Mathematically, a number X can be represented according to the equation:

$$X = \sum_{i=0}^{n-1} a_i w_i \quad (5)$$

where:

$$w_i = \prod_{j=1}^{i-1} m_j \quad i \geq 1 \quad (6)$$

$$w_0 = 1 \quad (7)$$

and:

$$0 \leq a_i \leq m_i - 1$$

The mixed radix representation provides implicit sign and magnitude information and is useful in overflow detection and rescaling.

Figure 5:
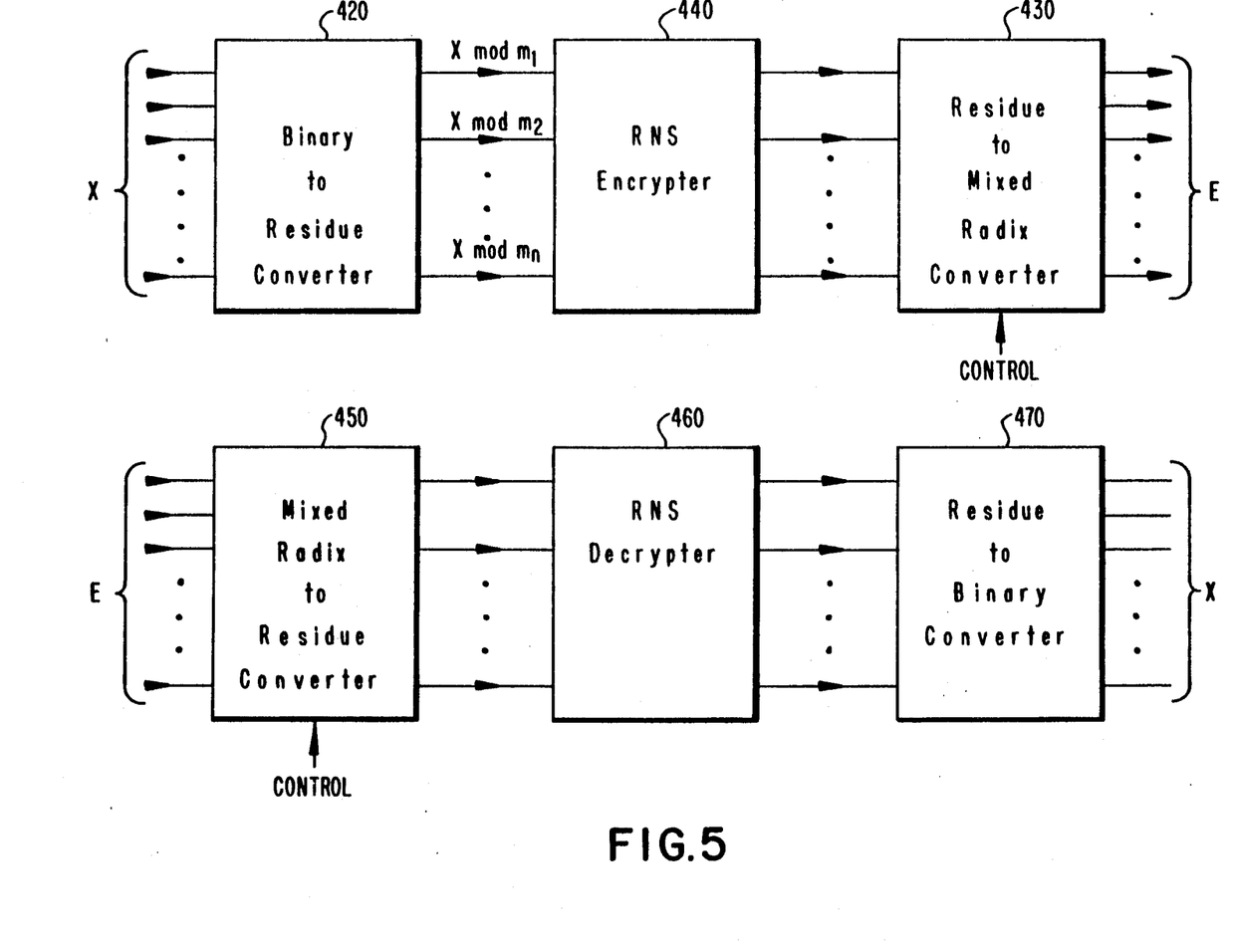
FIG. 5 illustrates a third preferred embodiment of the invention.

FIG. 5 illustrates a third preferred embodiment of the invention. In the third embodiment, a binary input number X is converted into residue number representation in a binary to residue converter 420. The output of the binary to residue converter 420 is then encrypted in an RNS encrypter 440. The RNS encrypter 440 may be, for example, the same design as encrypter 200, previously described. The output of the RNS encrypter 440 is converted into mixed radix representation in a residue to mixed radix converter 430. Binary encoded mixed radix coefficient information E is output from the residue to mixed radix converter 430 and is transmitted as an encrypted signal to a mixed radix to residue converter 450 at the receiving end.

The output of the mixed radix to residue converter 450 is decrypted in an RNS decrypter 460. The RNS decrypter 460 may be, for example, the same design as decrypter 300, previously described. A residue to binary converter 470 inputs the signal from the RNS decrypter 460, converts the signal into binary representation, and then outputs the original input signal X.

Converters 430 and 450 are described more particularly in copending application No. 07/219,392 and in the Szabo and Tanaka text mentioned above.

In addition to reduced system hardware, conversion to a mixed radix representation allows a further degree of encryption. As seen from equations (5) and (6), the order of the moduli, $m_j$, affects the conversion process. A set of switches can be employed in the residue to mixed radix converter 430 and in the mixed radix to residue converter 450 to change the order of the conversion in a pseudo random fashion, thereby adding to the complexity of the resulting cipher and tending to further regularize the frequency distributions of the mixed radix digits E.

There are two basic methods to change the order of conversion. The first method is to change inputs and internal moduli of a converter having fixed internal connections. The second method is to change internal connections in a converter having fixed inputs and fixed moduli. A third method, which changes inputs, internal moduli, and internal connections, can also be employed.

The conversion process is reversed at the decryption end.

Figure 6:
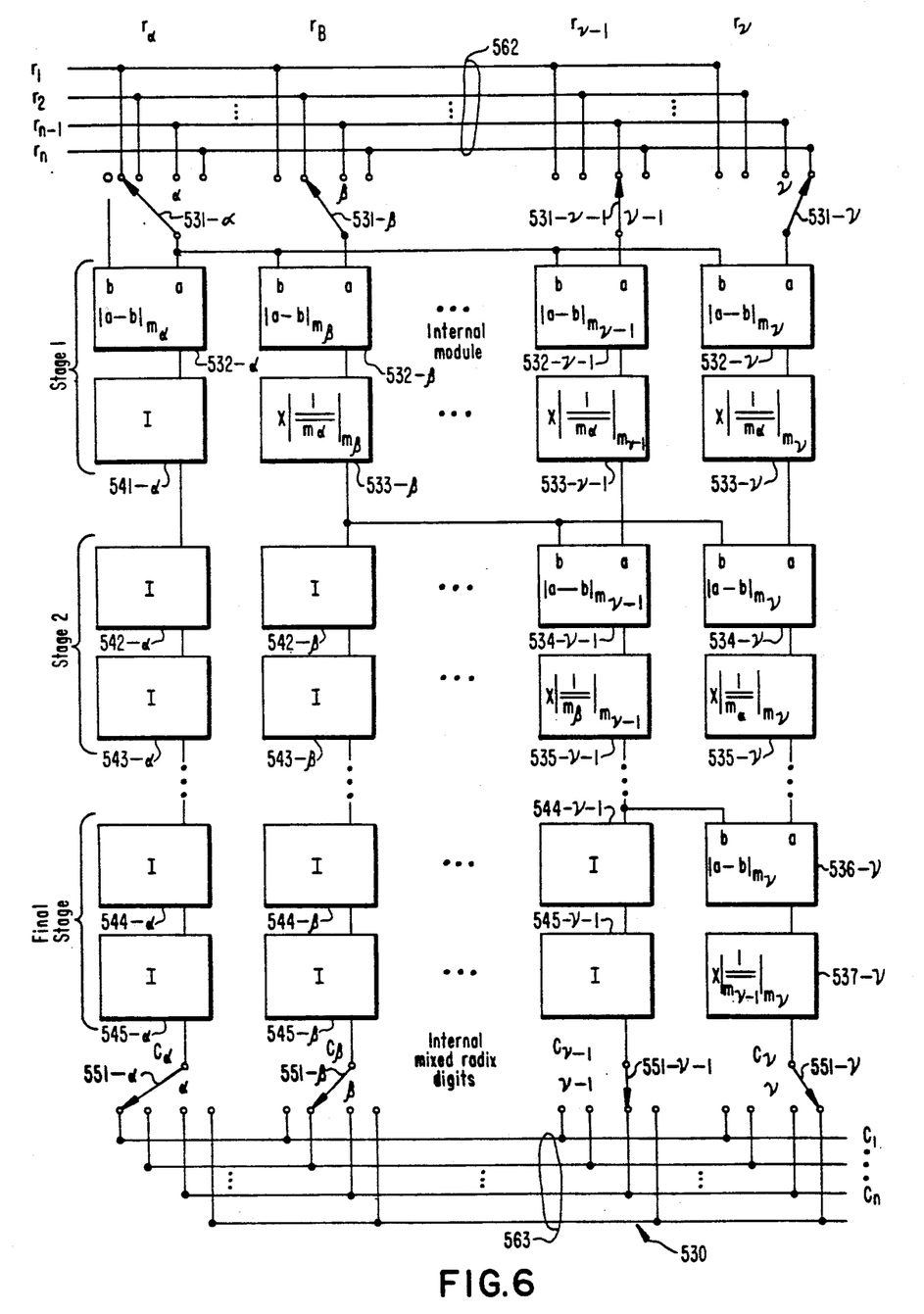
FIG. 6 illustrates a first, a second, and a final stage of a residue to mixed radix converter in which the order of conversion changes by a first method.

FIG. 6 illustrates a residue to mixed radix converter 530 which employs the first method. The converter 530 can be used in lieu of the converter 430 illustrated in FIG. 5 when further encryption is required. A mixed radix to residue converter corresponding to the residue to mixed radix converter 530 must be employed when the residue to mixed radix converter 530 is used. Those skilled in the art would be able to build a mixed radix to residue converter corresponding to the residue to mixed radix converter 530 based on the detailed description of the converter 530 below and the copending applications and references cited above, and therefore a detailed description of a mixed radix to residue converter corresponding to residue to mixed radix converter 530 will not be repeated here.

FIG. 6 illustrates a first, a second, and a final stage of the residue to mixed radix converter 530 having variable inputs and variable internal moduli and fixed internal connections. The internal connections are similar to those described in co-pending application No. 07/219,392, cited above, except that the channel for the first residue to be converted appears in the left-hand column of processing elements, instead of the right-hand column as in the 07/219,392 co-pending application.

The converter 530 receives residue digits $r_1, r_2 \ldots r_{n-1}, r_n$ and generates internal mixed radix digits $c_1, c_2 \ldots c_{n-1}, c_n$. The converter includes modular subtractors 532, 534, and 544; modular multipliers 533, 535, and 537; and delay units 541-545. The subtractors can be modular adders with their inputs connected to perform subtraction. The delay units preserve the synchrony of the system by delaying signals through identity operations, that is, modular addition of zero or modular multiplication by one. The subtractors, multipliers, and delay units can be optical arithmetic and logic units such as described in U.S. Pat. No. 4,797,843 and co-pending applications Nos. 07/019,761, and 07/219,392, cited above.

Each column of processing elements in FIG. 6 is associated with one of internal moduli $m_\alpha, m_{62} \ldots m_{\nu-1}, m_\nu$. For example, the left-most column performs modulo $m_\alpha$ operations and the right-most column performs modulo $m_\nu$ operations. The input residue digits $r_1, r_2, \ldots r_{n-1}, r_n$ are distributed across all the columns by a set of interconnections 562 such that the residue digits are selected by switches 531 at the top of each column. In general, each of the switches 531 may select any residue digit, but no two switches may select the same residue digit. Selection is performed in accordance with a control signal (not shown).

When a particular residue is selected for processing by a given column, all of the processing elements in that column operate with respect to the modulus associated with that particular residue via control signals (not shown). For example, if switch 531-$\alpha$ is positioned to select residue digit $r_1$, that is, internal residue $r_\alpha$ equals $r_1$, then internal modulus $m_\alpha$ is $m_1$. If switch 531-$\alpha$ were set to $r_n$, the $m_\alpha$ would be equal to $m_n$. At the end of each processing column, internal mixed radix digits $c_\alpha, c_\beta \ldots c_{\nu-1}$, and $c_\nu$ are selected and rearranged by switches 551 and interconnections 563 such that the order of the internal mixed radix digits corresponds to the input residues $r_1, r_2, \ldots r_{n-1}, r_n$. Each of switches 551 is set to the same position as its associated switch 531. Thus, if the usual order, illustrated in FIG. 6, is selected, $c_\alpha$ is equal to $c_1$, $c_\beta$ is equal to $c_2$, and so forth. The internal mixed radix digits are then transmitted as the encrypted signal.

Switches 551 and associated interconnections can be located at either the transmitter or the receiver of a communications link. Locating the switches and interconnections at the receiver has the advantage of further regularizing the frequency distribution of the ciphertext digits.

Figure 7:
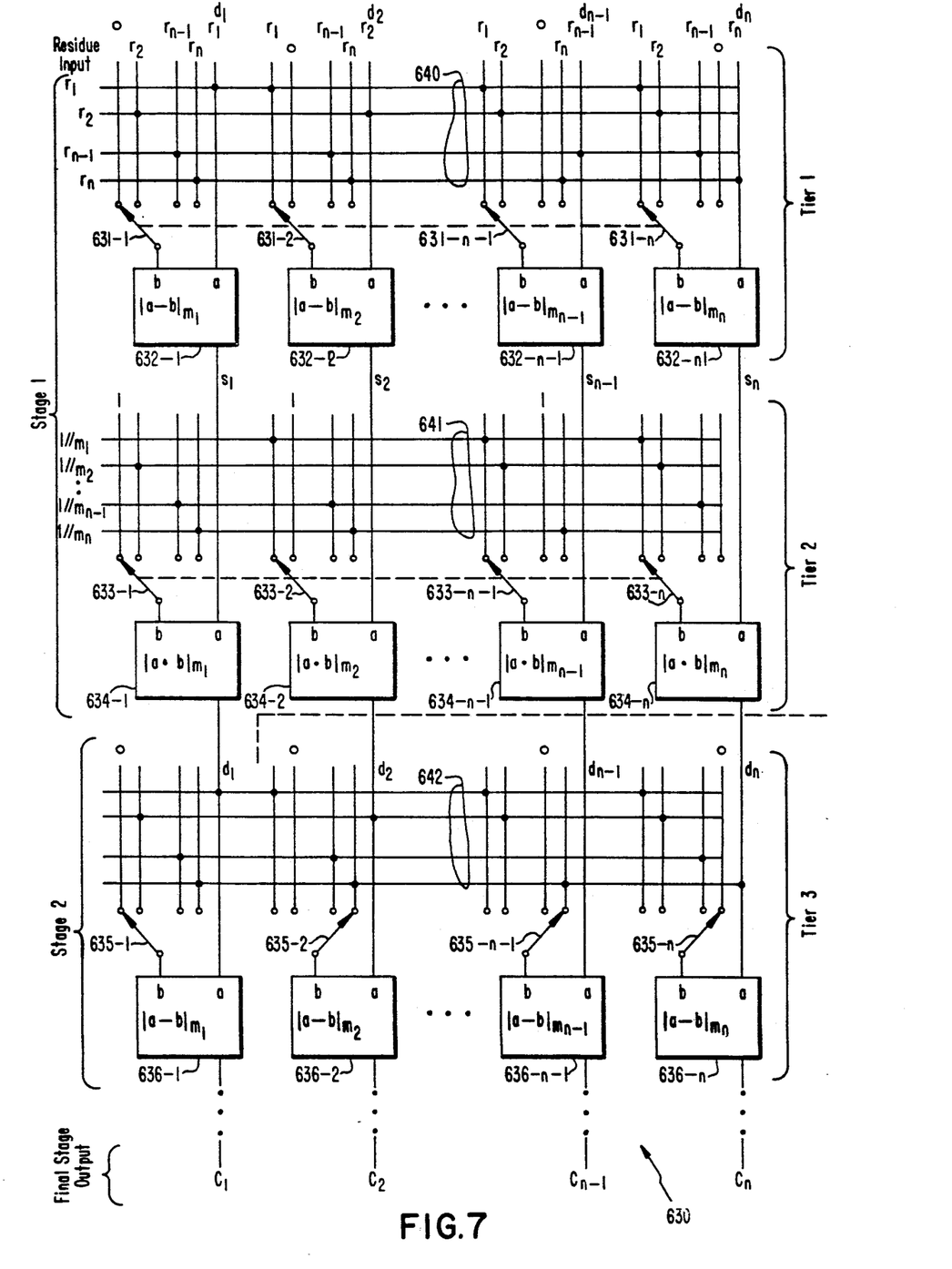
FIG. 7 illustrates a first, a second, and a final stage of a residue to mixed radix converter in which the order of conversion changes by a second method.

FIG. 7 illustrates a first stage and part of a second stage of a residue to mixed radix converter 630 in which the modulus $m_j$ associated with each processing column is fixed and the converter interconnections are varied to change the conversion order. The converter 630 can be constructed from the optical components referred to above. The second and succeeding stages are identical to the first stage. In each stage, input digits $d_j$ mod $m_j$ are connected to a inputs of a-b modular subtracters 632 in a first tier. These input digits are also distributed across all the columns by first switch input interconnections 640 so that each input digit can be selected by a subtracter input switch 631 at the b input of its associated subtracter 632. The mixed radix conversion algorithm never subtracts a digit $d_j$ mod $m_j$ from itself, so the interconnections 640 substitute zero for each $d_j$ mod $m_j$ input and forms $d_i$ mod $m_j$ ($i \neq j$) for the remaining switch inputs in each module $m_j$ column.

The subtracter 632 outputs, $s_j$ mod $m_j$, are transmitted to inputs of an a.b modulo $m_j$ multiplier in a second tier of the first stage. A second switch interconnection 641 distributes the multiplicative inverses $$\frac{1}{m_i}$$

of the moduli across the columns of the second to a second set of switches 633 at the b inputs to each multiplier 634. The theory of multiplicative inverses is discussed in the Szabo and Tanaka reference cited above. Because the multiplication algorithm never multiplies by $$\frac{1}{m_j} = \text{mod } m_j$$

(i.e., this entity is undefined), the second switch interconnection 641 substitutes one for each $$\frac{1}{m_j} = \text{mod } m_j$$

and transmits $$\frac{1}{m_i} = \text{mod } m_j \, (i \neq j)$$

for the remaining multiplier switch 633 inputs in each modulo $m_j$ column.

The 631 and 633 switch settings and the switch settings in subsequent stages are programmed according to two rules based on the mixed radix conversion algorithm. The first rule is that a mixed radix digit found in a previous stage is subjected only to identity operations in the current stage. The second rule is that when a new modulus $m_{c'}$, chosen to be the next in the conversion order, is selected, all of the switches in the stage are set to the $m_{c'}$ position, except for those set in accordance with the first rule. That is, the digit $d_{c'}$ is selected by the first, or subtracter, switch interconnection and the multiplicative inverse $$\frac{1}{m_{c'}}$$

is selected in the second, or multiplier, switch interconnection.

The switch 631, 633, and 635 positions illustrated in FIG. 7 illustrate these rules. In the first stage in FIG. 7, the input digits $d_j$ to the first stage equal the residues $r_j$ to be converted. Modulus $m_1$ and residue $r_1$ are shown associated with the left-hand column, $m_2$ and $r_2$ with the next column, and so on. This order of moduli and their associated residues is arbitrary. The subtracter 632 outputs are shown connected to the a multiplier inputs, although the b inputs can be used instead of the a inputs.

In computing the first mixed radix digit $c_1$, presently unknown, the first modulus in the conversion order is shown as $m_1$, a typical but arbitrary choice. Following the first rule, all of the first stage subtracter switches 631 are set to the $m_1$ position, so that $(r_j - r_1)$ mod $m_j$ ($j \neq 1$) and $(r_1 - 0)$ mod $m_1$ is calculated in the first tier. All of the first stage multiplier switches 633 are set to the $m_1$ position, so that the products $$\left( s_j \cdot \frac{1}{m_1} \right) \text{mod } m_j \, (j \neq 1) \text{ and } (s_1 \cdot 1) \text{ mod } m_1$$

are computed.

The first stage output digit $d_1$ in FIG. 7 equals the required mixed radix digit $c_1$. In computing the second mixed radix digit $c_2$, the next modulus in the conversion order is shown in FIG. 7 as $m_n$, the modulus omitted in the typical order. Following the first rule, the third tier switch in the $m_1$ column 635-1 is set to the $m_1$ position so as to form the difference $(d_1 - 0)$ mod $m_1$, that is, the identity operation. Following the second rule, the remaining switches 635-2 through 635-n of the third tier are set to the $m_n$ position. The output from the $m_2$ subtracter 636-2 is $(d_2 - d_n)$ mod $m_2$, which equals $c_2$ and which will be multiplied by 1 in the next tier (not shown).

Further details concerning residue to mixed base conversion are described in copending application No. 07/414,019, filed Sept. 29, 1989, and entitled "Pipelined Residue to Mixed Base Converter and Base Extension Processor" by T. L. Houk et al. incorporated herein by reference.

The foregoing description has been set forth merely to illustrate preferred embodiments of the invention and is not intended to be limiting. Since modification of the described embodiments incorporating the spirit and substance of the invention may occur to persons skilled in the art, the scope of the invention should be limited solely with respect to the appended claims and equivalents.

What is claimed is:

1. A residue number encryption and decryption system, comprising:
    a first converter, said first converter receiving an input signal and converting said input signal into a second signal, said second signal being in residue number representation;
    an encrypter, said encrypter receiving and encrypting said second signal, and outputting a third signal in an encrypted residue number representation;
    a first-number-system-to-second-number-system converter, said first-number-to-second-number-system converter receiving said third signal and converting said third signal into a fourth signal, said fourth signal being in a number system representation other than residue number representation;
    a second-number-system-to-first-number-system converter, said second-number-system-to-first-number-system converter receiving said fourth signal and converting said fourth signal into a fifth signal, said fifth signal being in encrypted residue number representation;
    a decrypter, said decrypter receiving and decrypting said fifth signal, and outputting a sixth signal; and
    a fourth converter, said fourth converter receiving said sixth signal and converting said sixth signal into an output signal, said output signal providing the same information as said input signal.

2. A residue number encryption and decryption system as set forth in claim 1, wherein said encrypter comprises:
    first pseudo random number generator means for generating a first set of pseudo random number signals in a residue number system (RNS) representation corresponding to a plurality of pseudo random numbers;
    first modular operation means for performing modular arithmetic, said first modular operation means performing modular arithmetic operations, using said second signal and said first set of pseudo random number signals as operands, to produce said third signal; and
    wherein said decrypter comprises:
    second pseudo random number generator means for generating a second set of pseudo random number signals in a RNS representation corresponding to said plurality of pseudo random numbers; and
    second modular operation means for performing modular arithmetic, said second modular operation means performing modular arithmetic operations, using said fifth signal and said second set of pseudo random number signals as operands, to produce said sixth signal.

3. A residue number encryption and decryption system as set forth in claim 2, wherein:
    said first modular operation means adds said second signal to said first set of pseudo random number signals; and
    said second modular operation means subtracts said second set of pseudo random number signals from said fifth signal.

4. A residue number encryption and decryption system as set forth in claim 2, wherein:
    said first modular operation means subtracts said second signal from said first set of pseudo random number signals; and
    said second modular operation means subtracts said fifth signal from said second set of pseudo random number signals.

5. A residue number encryption and decryption system as set forth in claim 2, wherein said second, third, fourth, fifth, and sixth signals and said first and second sets of pseudo random number signals are optic signals.

6. A residue number encryption and decryption system as set forth in claim 2, wherein said second, third, fourth, fifth, and sixth signals and said first and second sets of pseudo random number signals are electronic signals.

7. A residue number encryption and decryption system as set forth in claim 2, wherein:
    said input and output signals and said fourth signal are in binary representation;
    said first and third converters are binary to residue number system converters; and
    said second and fourth converters are residue number system to binary converters.

8. A residue number encryption and decryption system as set forth in claim 2, wherein:
    moduli used in residue number representations are varied in time; and
    a key is passed between said encrypter and said decrypter, said key indicating which moduli are to be used by said residue number encryption and decryption system.

9. A residue number encryption and decryption system as set forth in claim 2, wherein:
    said input and output signals are in binary representation;
    said first converter is a binary to residue number system converter;
    said second converter is a residue number system to mixed radix number system converter:
    said fourth signal is in mixed radix number system representation;
    said third converter is a mixed radix number system to residue number system converter; and
    said fourth converter is a residue number system to binary converter.

10. A residue number encryption and decryption system as set forth in claim 9, wherein:
    said second converter changes inputs and internal moduli over time and has fixed internal connections.

11. A residue number encryption and decryption system as set forth in claim 9, wherein
    said second converter varies internal connections over time and uses fixed inputs and fixed moduli.

12. A residue number encryption and decryption system as set forth in claim 11, wherein said second converter comprises:
    a plurality of stages, each stage including modular subtracters arranged parallel to each other and modular multipliers arranged parallel to each other.

13. A residue number encryption and decryption system as set forth in claim 12, wherein each stage further comprises:
    a plurality of first switches to select residue digits; and
    a plurality of second switches to select multiplicative inverses.

14. A residue number encryption and decryption system as set forth in claim 13, wherein:
    when a new modulus, chosen to be next in a conversion order in a next stage, is selected, all of said first and second switches in said next stage are set to a new modulus position, except for switches associated with mixed base digits which have been calculated.

15. A method of encrypting and decrypting, comprising the steps of:
converting an input signal into a second signal, said second signal being a residue number system (RNS) representation of said input signal;
generating a first set of pseudo random number signals, said first set of pseudo random number signals being in a RNS representation and corresponding to a sequence of pseudo random numbers;
performing modular arithmetic operations, using said second signal and said first set of pseudo random number signals as operands, to generate a third signal;
transmitting said third signal to a receiver;
receiving said third signal in a receiver;
generating a second set of pseudo random number signals for said receiver, said second set of pseudo random number signals being in a RNS representation and corresponding to said sequence of pseudo random numbers; and
performing modular arithmetic operations at said receiver, using said third signal and said second set of pseudo random number signals as operands, to generate an output signal, said output signal providing the same information as said input signal.

16. A method of encrypting and decrypting as set forth in claim 15, wherein said transmitting step comprises the step of:
converting said third signal from RNS representation into binary representation; and wherein said receiving step comprises the step of:
converting said third signal from binary representation into RNS representation.

17. A method of encrypting and decrypting as set forth in claim 15, wherein said transmitting step comprises the step of:
converting said third signal from RNS representation into mixed radix number system representation; and wherein said receiving step comprises the step of:
converting said third signal from mixed radix number system representation into RNS representation.

18. A method of encrypting and decrypting as set forth in claim 17, wherein:
an order of said converting of said third signal from RNS representation into mixed radix number system representation is varied;
an order of said converting of said third signal from mixed radix number system representation into RNS representation is varied.

19. An encrypter comprising:
first pseudo random number generator means for generating a first set of pseudo random number signals in a residue number system (RNS) representation corresponding to a plurality of pseudo random numbers;
first modular operation means for performing modular arithmetic, said first modular operation means performing modular arithmetic operations, using a second signal and said first set of pseudo random number signals as operands, to produce a third signal;
communication link means for transmitting said third signal to another location, the output from said communication link means being a fifth signal;
second pseudo random number generator means for generating a second set of pseudo random number signals in a RNS representation corresponding to said plurality of pseudo random numbers; and
second modular operation means for performing modular arithmetic, said second modular operation means performing modular arithmetic operations, using said fifth signal and said second set of pseudo random number signals as operands, to produce a sixth signal.

20. An encrypter as set forth in claim 19, wherein:
said first modular operation means adds said second signal to said first set of pseudo random number signals; and
said second modular operation means subtracts said second set of pseudo random number signals from said fifth signal.

21. An encrypter as set forth in claim 19, wherein:
said first modular operation means subtracts said second signal from said first set of pseudo random number signals; and
said second modular operation means subtracts said fifth signal from said second set of pseudo random number signals.

22. An encrypter as set forth in claim 19, wherein said second, third, fifth, and sixth signals and said first and second sets of pseudo random number signals are optic signals.

23. An encrypter as set forth in claim 19, wherein said second, third, fifth, and sixth signals and said first and second sets of pseudo random number signals are electronic signals.

24. An encrypter as set forth in claim 19, wherein:
input and output signals to said encrypter are in binary representation; and
said third signal is transmitted in binary representation.

25. An encrypter as set forth in claim 19, wherein:
input and output signals to said encrypter are in binary representation; and
said third signal is transmitted in mixed radix number system representation.

* * * * *